United States Patent
Zhao et al.

(10) Patent No.: US 12,529,714 B2
(45) Date of Patent: Jan. 20, 2026

(54) DUAL-CHANNEL CURRENT SENSOR

(71) Applicant: Suzhou Littelfuse OVS Co., Ltd., Suzhou (CN)

(72) Inventors: Jianfei Zhao, Suzhou (CN); Antonin Pons, Chicago, IL (US); Florent Jolly, Chicago, IL (US)

(73) Assignee: Suzhou Littelfuse OVS Co., Ltd., Suzhou (CN)

( * ) Notice: Subject to any disclaimer, the term of this patent is extended or adjusted under 35 U.S.C. 154(b) by 220 days.

(21) Appl. No.: 18/512,791

(22) Filed: Nov. 17, 2023

(65) Prior Publication Data

US 2024/0168064 A1 May 23, 2024

(30) Foreign Application Priority Data

Nov. 22, 2022 (CN) .......................... 202211468204.9

(51) Int. Cl.
*G01R 15/20* (2006.01)
*G01R 19/00* (2006.01)

(52) U.S. Cl.
CPC ....... *G01R 15/202* (2013.01); *G01R 19/0092* (2013.01)

(58) Field of Classification Search
CPC . G01R 15/202; G01R 15/207; G01R 19/0092
See application file for complete search history.

(56) References Cited

U.S. PATENT DOCUMENTS

| | | | |
|---|---|---|---|
| 2002/0145416 A1 | 10/2002 | Attarian | |
| 2008/0077336 A1 | 3/2008 | Fernandes | |
| 2008/0290857 A1* | 11/2008 | Lepine | G01R 15/207 324/117 R |
| 2010/0097049 A1* | 4/2010 | Lepine | G01R 15/207 324/117 H |
| 2013/0154629 A1* | 6/2013 | Gudel | H01F 27/2895 324/225 |
| 2013/0200903 A1* | 8/2013 | Labbe | G01R 31/382 324/437 |

(Continued)

FOREIGN PATENT DOCUMENTS

| | | |
|---|---|---|
| CN | 207181578 | 4/2018 |
| CN | 109142837 | 1/2019 |

(Continued)

OTHER PUBLICATIONS

Extended European Search Report for EP Application No. 23206780.1, dated Apr. 22, 2024, 8 pages.

*Primary Examiner* — Dominic E Hawkins
(74) *Attorney, Agent, or Firm* — KDW Firm PLLC

(57) ABSTRACT

A dual-channel current sensor includes a housing, a core, and a printed circuit board assembly (PCBA). The housing has a cylindrical cavity and an end portion, where the cylindrical cavity is open at a first end. The core is cylindrical in shape with flattened top and bottom surfaces and has a flat zone on an interior surface, a gap perpendicular and opposite the flat zone, a first portion adjacent one side of the gap, and a second portion adjacent the other, opposite side of the gap. The core is inserted into first end of the cylindrical cavity. The PCBA, which is inserted into the end portion of the housing, has a sensor disposed in the gap.

12 Claims, 8 Drawing Sheets

(56) References Cited

U.S. PATENT DOCUMENTS

| | | | | |
|---|---|---|---|---|
| 2016/0187387 A1* | 6/2016 | Mouchet | ............ | H01F 41/0213 29/605 |
| 2016/0313373 A1 | 10/2016 | Plagne | | |
| 2017/0010310 A1* | 1/2017 | Morel | .................. | H01R 13/745 |
| 2020/0379017 A1* | 12/2020 | Claeys | .................. | G01R 19/00 |
| 2023/0408553 A1* | 12/2023 | Han | ..................... | G01R 15/183 |

FOREIGN PATENT DOCUMENTS

| | | |
|---|---|---|
| EP | 2680013 A1 | 1/2014 |
| EP | 3159705 A1 | 4/2017 |
| JP | 2013140140 A | 7/2013 |
| JP | 6461419 B1 | 1/2019 |
| WO | 2020193501 A1 | 10/2020 |

\* cited by examiner

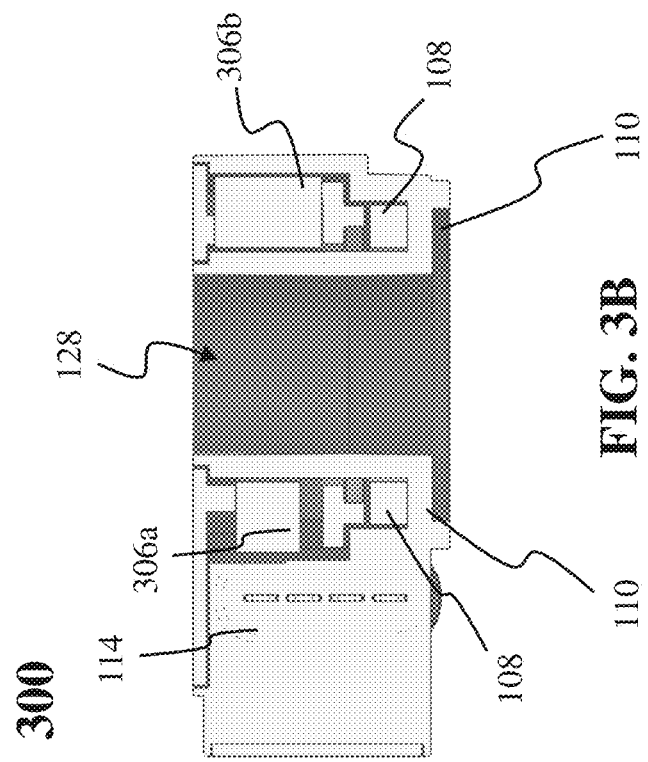
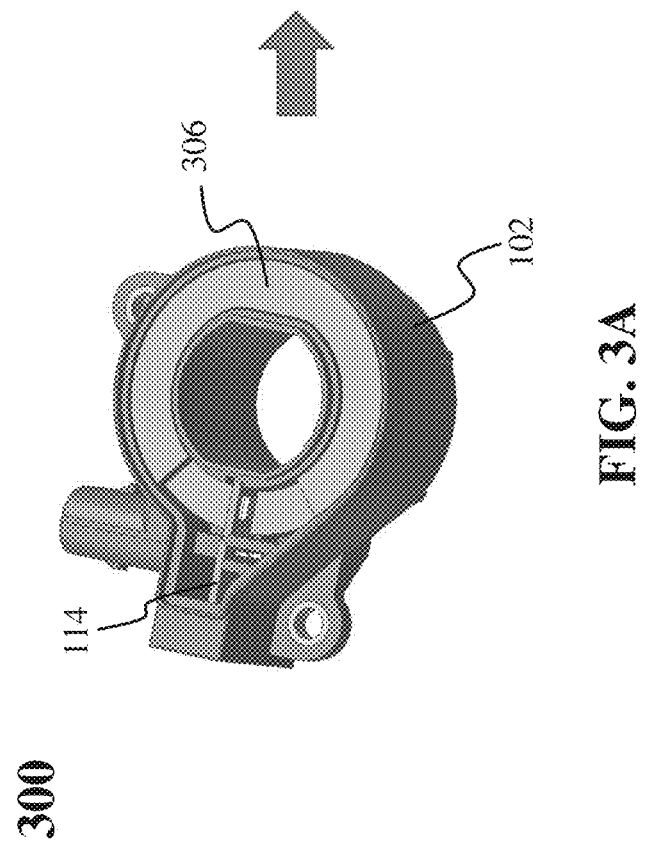
FIG. 3A
FIG. 3B

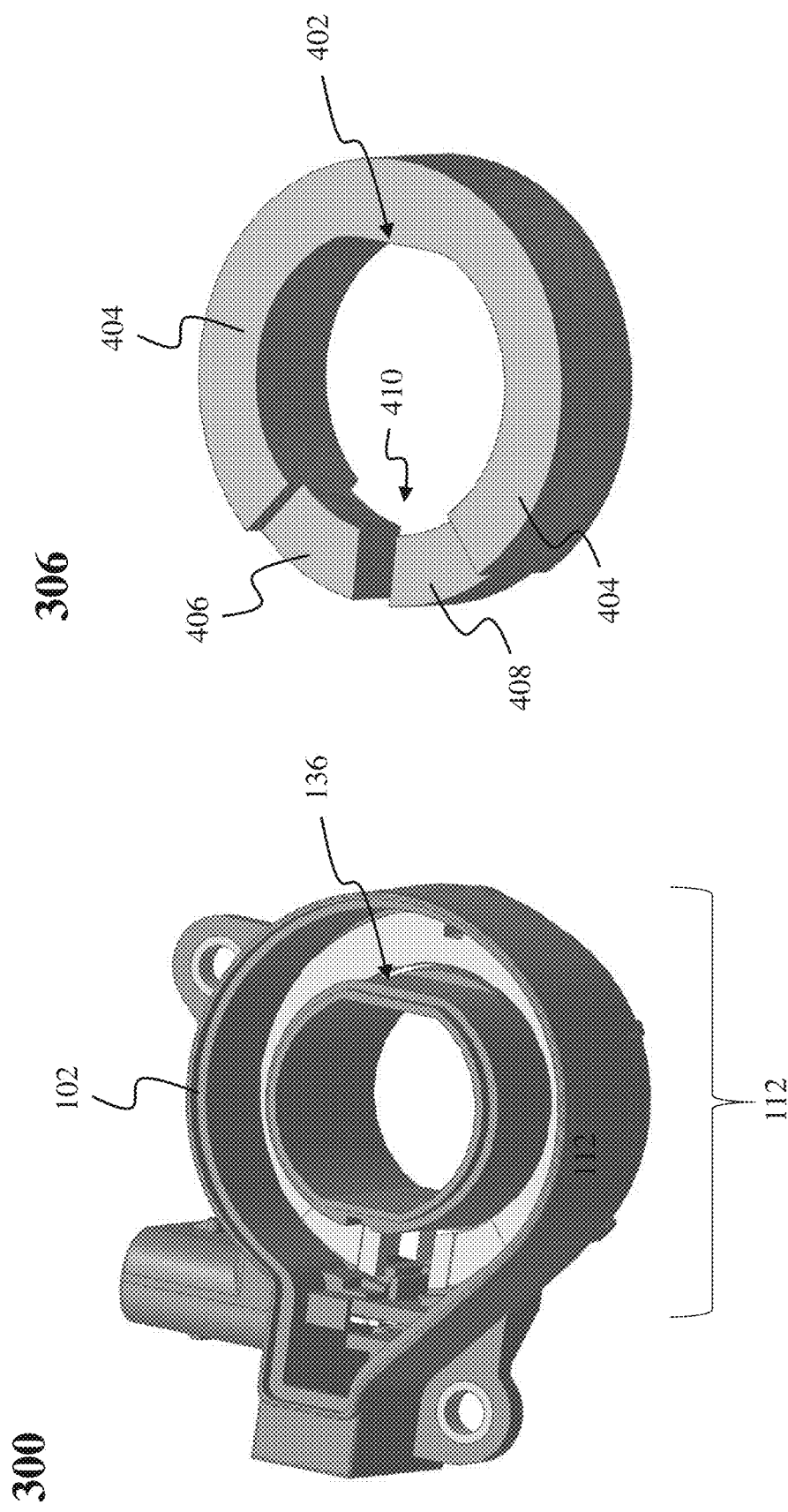

DUAL-CHANNEL CURRENT SENSOR

CROSS-REFERENCES TO RELATED APPLICATIONS

This application claims the benefit of priority to, Chinese Patent Application No. 2022114682049, filed Oct. 14, 2022, entitled "DUAL-CHANNEL CURRENT SENSOR," which application is incorporated herein by reference in its entirety.

FIELD OF THE DISCLOSURE

Embodiments of the present disclosure relate to current sensors and, more particularly, current sensors for use in Electronic Vehicle systems.

BACKGROUND

Current sensors detect the current that flow through a carrying conductor, such as a wire or cable. Electronic Vehicle (EV) systems, such as the battery charger system, the battery system, the power distributor system, the inverter system, and the converter system, may employ current sensors.

A Hall effect current sensor consists of an open-loop magnetic core and a Hall sensor, which is a magneto sensitive semiconductor device. The Hall sensor is placed in the gap of the core. A carrying conductor, such as a cable, is disposed through the loop of the core. When current passes through the conductor, a magnetic field is produced on the core. When the Hall sensor is exposed to the magnetic field from the core, a small Hall voltage is produced. The Hall voltage is proportional to the product of the current in the conductor and the magnetic field proportional to the surface area of the sensor. Hall sensors are able to detect current within a small current range.

The shape of the magnetic core can affect its saturation point as well as the linearity of the Hall sensor output. If the magnetic core is a wound core, there are limitations to how it can be shaped, which limits both of these characteristics. Where two cores are replaced in respective hollow rings with a PCBA, the electronic components of the PCBA would be destroyed during ultrasonic welding. Further, two-sided welding for cores has a low manufacturing efficiency.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of dual-channel current sensor in accordance with the present disclosure may include a housing, a core, and a printed circuit board assembly (PCBA). The housing has a cylindrical cavity and an end portion, where the cylindrical cavity is open at a first end. The core is cylindrical in shape with flattened top and bottom surfaces and has a flat zone on an interior surface, a gap perpendicular and opposite the flat zone, a first portion adjacent one side of the gap, and a second portion adjacent the other, opposite side of the gap. The core is inserted into the first end of the cylindrical cavity. The PCBA, which is inserted into the end portion of the housing, has a sensor disposed in the gap.

BRIEF DESCRIPTION OF THE DRAWINGS

FIGS. 3A-3B are diagrams illustrating a dual-channel current sensor with a stamped core, in accordance with exemplary embodiments;

FIGS. 4A-4D are diagrams illustrating the dual-channel current sensor of FIGS. 3A-3B, in accordance with exemplary embodiments;

DETAILED DESCRIPTION

A dual-channel sensor consists of two cores, one larger than the other, separated by a spacer that are inserted into a housing. The two cores are cylindrical in shape, each having flat top and side surfaces, and each having a gap. The housing has an end portion and a cylindrical cavity that is opened at one end. The smaller core is first inserted into the housing, followed by the spacer, then, finally, the larger core is inserted therein. A printed circuit board assembly (PCBA) having two sensors is inserted into the end portion of the housing, such that the first sensor occupies a gap in the larger core while the second sensor occupies a gap in the smaller core. The larger core may be stamped to have a flat zone that fits into the cylindrical cavity having a similar flat zone. The larger core also has two portions, disposed on either side of the gap, that are of a lower height than the rest of the core. The end portion of the housing has rigid positioning parts to hold the PCBA during press-fit pin insertion.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1B:
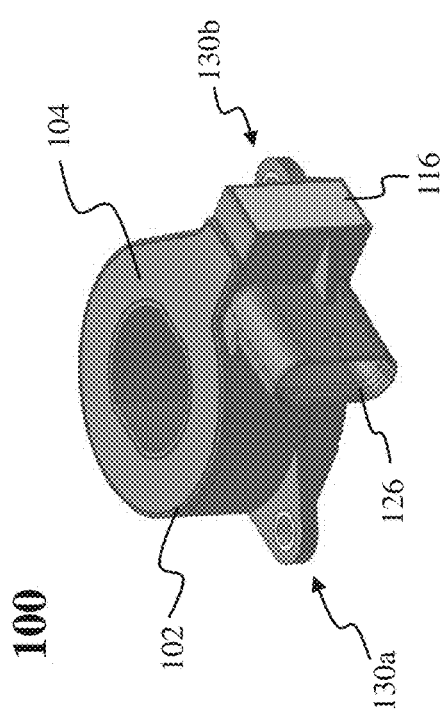
FIGS. 1A-1D are diagrams illustrating a dual-channel current sensor, in accordance with exemplary embodiments.
Figure 1C:
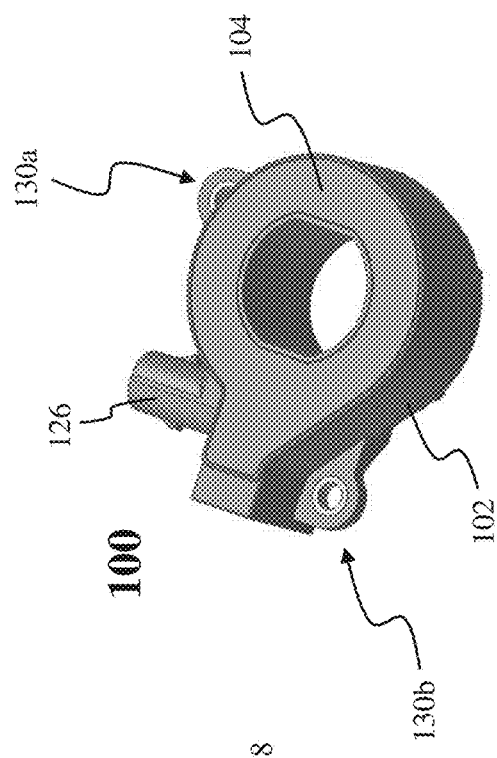
Figure 1A:
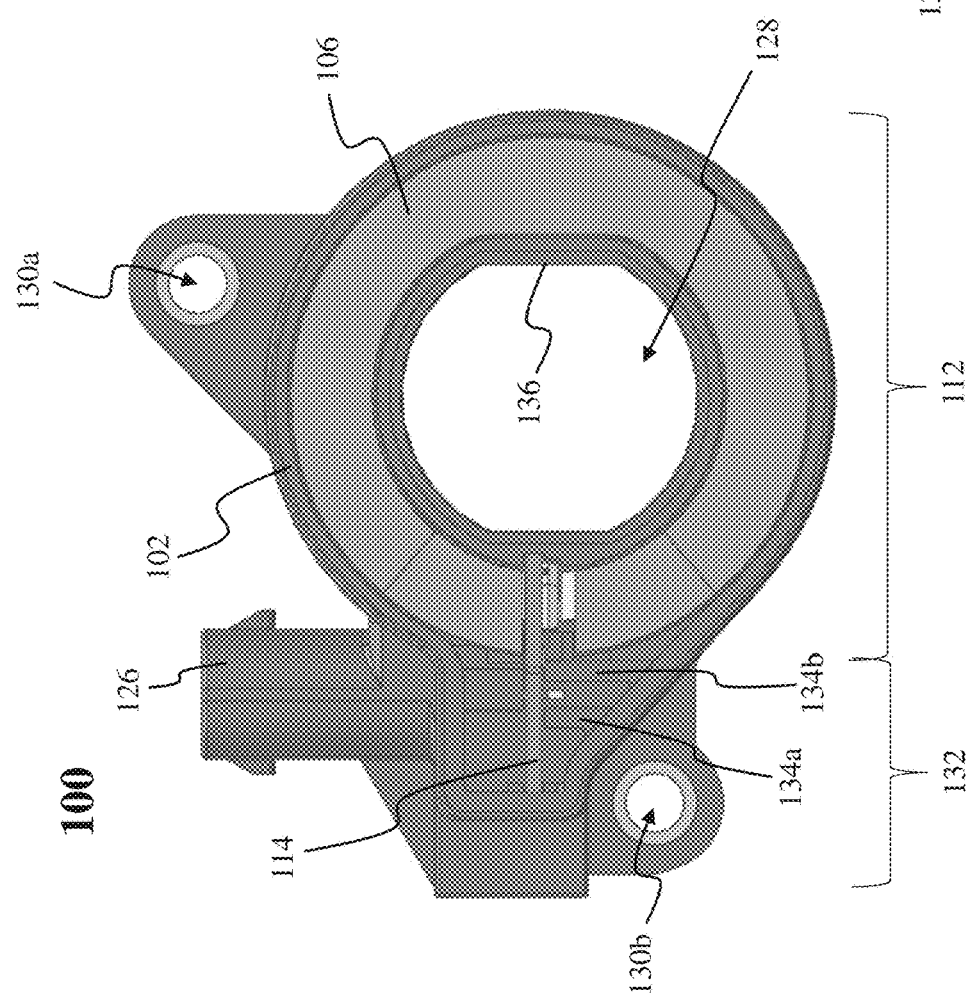
Figure 1D:
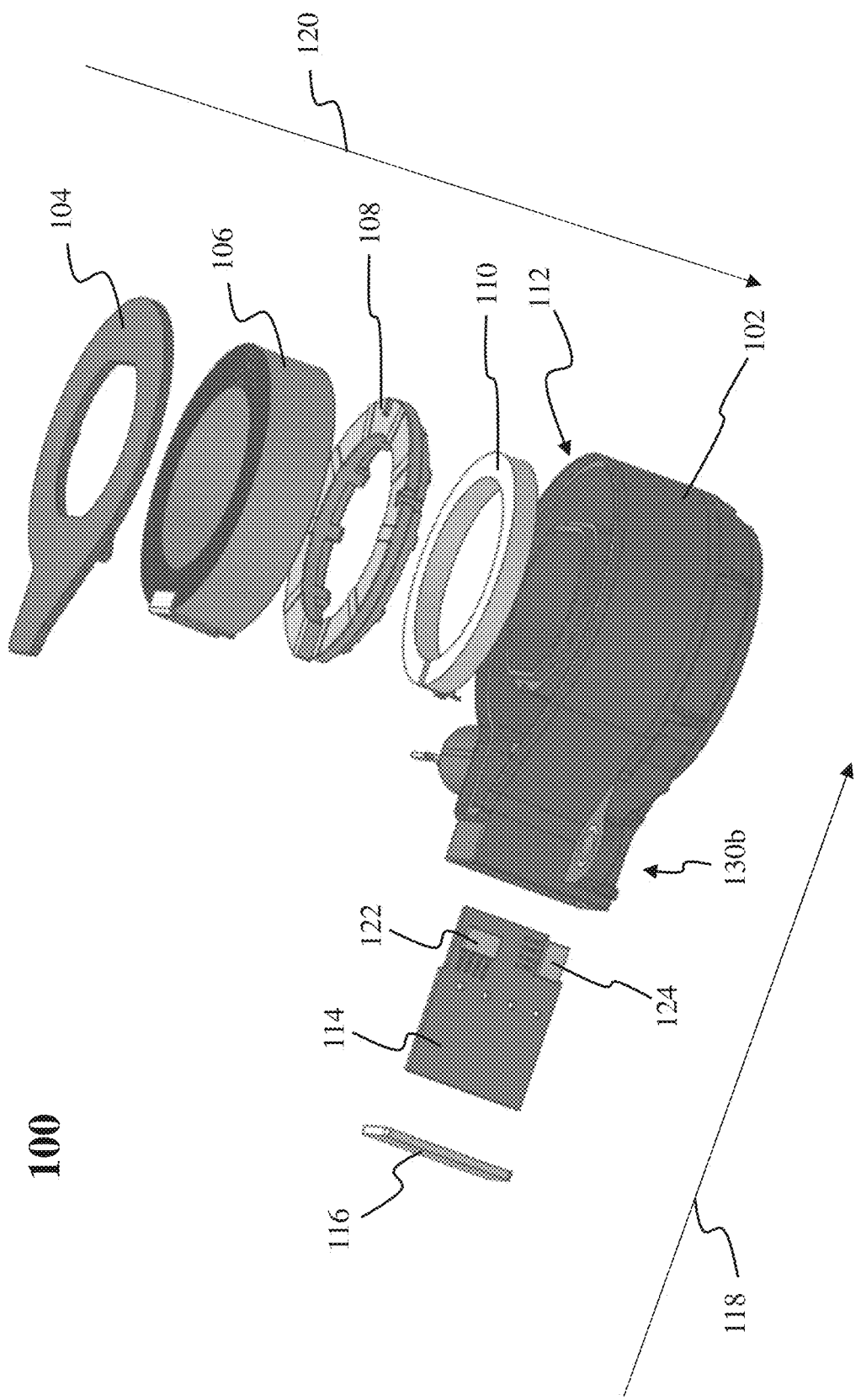

FIGS. 1A-1D are representative drawings of a dual-channel current sensor 100 for providing current sensing, according to exemplary embodiments. FIG. 1A is an overhead view, FIGS. 1B-C are perspective views, and FIG. 1D is an exploded perspective view of the dual-channel current sensor 100. The dual-channel current sensor 100 features two cores, a first core 106 and a second core 110, separated by a spacer 108.

In exemplary embodiments, the first core 106 and the second core 110 are similar to one another, as both have approximately the same diameter and the same circumference, with the first core 106 having a greater height than the second core 110. The first core 106 may thus be thought of as the large core while the second core 110 is the small core. Both cores 106 and 110 are substantially cylindrically shaped or torus-shaped, with top and bottom surfaces being substantially flat and the outer and inside surfaces being rounded, except that, in an exemplary embodiment, the core 106 has a flattened portion on the inside surface. Both cores 106 and 110 are open cores, as each have a gap for accommodating a separate sensor. Both cores 106 and 110 have a hollow center for accepting a carrying conductor, such that the carrying conductor is substantially orthogonal to the cores.

The dual-channel current sensor 100 features a housing 102 having a cylindrical cavity 112 and an end portion 132. The cylindrical cavity 112 is a hollow ring, opened at one end, for receiving the first core 106 and the second core 110. In contrast to some prior art sensor housing, the cylindrical cavity 112 is not opened at the bottom. Thus, the first core 106, the spacer 108, and the second core 110 fit into the cylindrical cavity 112, with an arrow 120 showing the assembly direction: the second core 110 is inserted into the hollow cylindrical cavity 112, followed by the spacer 108, then followed by the first core 106. In exemplary embodiments, the spacer 108 ensures that there is some distance between the core 106 and the core 110. A top cover 104 is placed over the top opening of the cylindrical cavity 112, adjacent the first core 106, to close the housing 102. In exemplary embodiments, the top cover 104 is attached to the top of the cylindrical cavity 112 of the housing 102 and pressed against the core 106, the spacer 108, and the core 110 using ultrasonic welding.

The end portion 132 of the housing 102 includes an electrical connector receptacle 126 for connecting the dual-channel current sensor 100 to a power source. The end portion 132 further receives a printed circuit board assembly (PCBA) 114. The PCBA 114, once fully inserted, straddles between the end portion 132 and the cylindrical cavity 112 of the housing 102. In addition to other electronic components, the PCBA 114 includes a first sensing application specific integrated circuit (ASIC) 122 and a second sensing ASIC 124. As illustrated in FIG. 1D, the ASIC 122 is orthogonal to the ASIC 124. In a non-limiting embodiment, the ASIC 122 and the ASIC 124 are Hall sensors.

An arrow 118 shows the assembly direction of the PCBA 114: the side featuring ASICs 122 and 124 of the PCBA 114 is inserted first, then the PCBA is seated therein until partially occupying the cylindrical cavity 112 (FIG. 1A), then a side cover 116 is placed over the end portion 132. In exemplary embodiments, the side cover 116 is mounted by laser welding or other processes, such as epoxy potting. The side cover 116 thus seals the PCBA 114 inside the housing 102.

In some prior art implementations, the PCBA is inserted into the same opening of the housing that receives the core. The PCBA is inserted into the opening, then the core is inserted over the PCBA. During ultrasonic welding of the core, the electronic components of the PCBA may be damaged/broken. By having a separate insertion point to the PCBA 114 (the end portion 132), the PCBA may be inserted after the ultrasonic welding of the cores is complete. Further, the direction of insertion of the PCBA 114 into the end portion 132 is orthogonal to the insertion direction of the cores 106 and 110, in some embodiments. By having separated insertion between the PCBA 114 and the cores 106 and 110, the cover 104 may be welded onto the housing 102 before the PCBA 114 is inserted into the end portion 132.

In exemplary embodiments, the end portion 132 of the housing 102 features rigid positioning parts 134*a-b* (collectively, "positioning part(s) 134") to hold the PCBA 114 during press-fit pin insertion. The positioning parts 134 help to control movement of the PCBA 114 from the electrical connector receptacle 126. Further, the rigidity of the positioning parts 134 holds the PCBA 114 during press-fit pin insertion.

An opening 128 of the housing 102 enables a carrying conductor, such as a cable, wire, or busbar, to be inserted through the opening. Current flowing through the carrying conductor will produce a magnetic field onto the cores 106 and 110, both of which are orthogonal to the current path. The ASIC 122 will sense the magnetic field on the core 106 and the ASIC 124 will sense the magnetic field on the core 110. The dual-channel current sensor 100 is so named because, on one channel, the ASIC 122 is measuring the magnetic field of core 106 to determine a current flowing through the carrying conductor and, simultaneously, on a second channel, the ASIC 124 is measuring the magnetic field of core 110 to determine the same current flowing through the carrying conductor.

The housing 102 further includes grommets 130*a-b* (collectively, "grommet(s) 130") which are part of the housing 102. Although surrounding a carrying conductor, such as a cable or busbar, the grommets 130 provide additional means to secure the dual-channel current sensor 100 to a chassis, a wall, or other stationary surface.

In exemplary embodiments, the first core 106 and second core 110 of the dual-channel current sensor 100 are designed to provide two ranges of current sensing. In exemplary embodiments, the first core 106, which is larger than the second core 110, is designed to sense a relatively large range of current while the second core 110 is designed to sense a relatively small range of current. In a non-limiting embodiment, the dual-channel current sensor 100 is used in electric vehicle (EV) applications, specifically, the battery system and the battery charging system.

In exemplary embodiments, the first core 106 is able to measure current in a range of +/−1000 A while the second core 110 is able to measure current in a range of +/−100 A. The dual-channel current sensor 100 thus provides very good accuracy for low current range in order to make better Amp-hr integration. An Amp hour is the rating used to determine how much amperage a battery can provide for exactly one hour.

Magnetic cores are magnetic material with a high magnetic permeability. The magnetic core is made of ferromagnetic material, such as iron, or ferromagnetic compounds, such as ferrites. Traditionally, magnetic cores are made by winding magnetic wire around a shaped object to create the magnetic core. Wound magnetic cores are thus limited by the possible shaped objects around which the wire is wound. Stamped magnetic cores, by contrast, are created by depositing a magnetic material, such as silicon steel, nickel ferrite, or other materials, into a mold. The stamped magnetic core can thus assume the shape of virtually any mold. The benefit of shaping the core in a particular shape include improving the linearity of the current measurements and affecting the saturation point of the core. The cost of the stamped core is also generally lower than that of a wound core with similar capabilities. There are thus fewer limitations when using stamped magnetic cores. Stamped magnetic cores, in addition to being cheaper, enable the creation of a particular shape that improves linearity.

In exemplary embodiments, the cylindrical cavity 112 of the housing 102 features a flat zone 136, disposed on an inner surface of the cylindrical cavity. Whereas a cylinder is a three-dimensional shape consisting of two parallel circular bases joined by a curved surface, a portion of the curved surface is flattened into a planar surface, and that planar shape is the flat zone 136. The flat zone 136 is designed to accommodate a stamped core having a flat portion on its interior surface. Thus, the stamped core, which is also cylindrical in shape, has a planar surface to accommodate the flat zone 136. Nevertheless, the housing 102, or more specifically, the cylindrical cavity 112, of the dual-channel current sensor 100, is able to accommodate either wound cores or stamped cores. The dual-channel current sensor 100 is thus flexible in being able to accommodate different application environments.

Figure 2B:
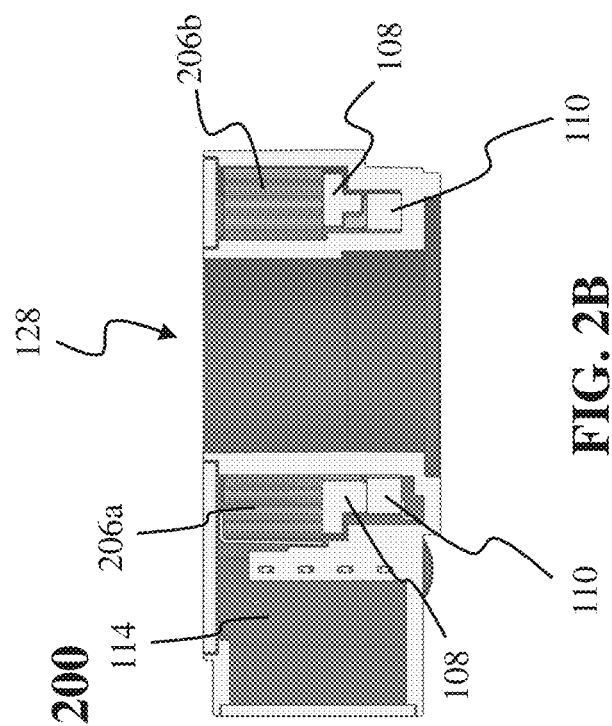
FIGS. 2A-2B are diagrams illustrating a dual-channel current sensor with a wound core, in accordance with exemplary embodiments.
Figure 2A:
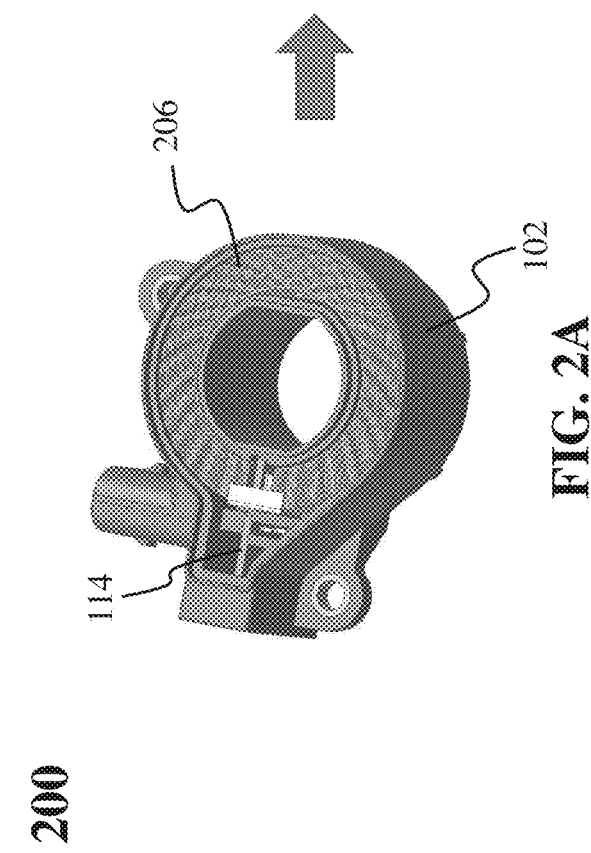

FIGS. 2A-2B are representative drawings of a dual-channel current sensor 200, according to exemplary embodiments. FIG. 2A is a perspective view and FIG. 2B is a side view of dual-channel current sensor 200. The housing 102, the spacer 108, the core 110, and the PCBA 114 are unchanged from the dual-channel current sensor 100. A core 206 is the large core disposed at the top of the cylindrical cavity 112. In exemplary embodiments, the core 206 is a wound core. In some embodiments, the core 110 is wound core. In other embodiments, the core 110 is a stamped core.

In the cross-sectional view of FIG. 2B, the core 206 is shown as two portions, 206a and 206b, on either side of the opening 128. The portion 206a is substantially similar to the portion 206b. This is because, being a wound core, the core 206 is generally uniform around its circumference. Nevertheless, the core 206 fits into the cylindrical cavity 112 of the housing 102.

FIGS. 3A-3B are representative drawings of a dual-channel current sensor 300, according to exemplary embodiments. FIG. 3A is a perspective view and FIG. 3B is a side view of dual-channel current sensor 300. The housing 102, the spacer 108, the core 110, and the PCBA 114 are unchanged from the dual-channel current sensor 100. A core 306 is the large core disposed at the top of the cylindrical cavity 112. In exemplary embodiments, the core 306 is a stamped core. In some embodiments, the core 110 is wound core. In other embodiments, the core 110 is a stamped core.

In the cross-sectional view of FIG. 3B, the core 306 is shown as two portions, 306a and 306b, on either side of the opening 128. In contrast to the portions 206a and 206b of the wound core 206, the portion 306a is different from the portion 306b. This is because the stamped core 306 can be generated from a mold. Like the wound core 206, the stamped core 306 fits into the cylindrical cavity 112 of the housing 102. The single hollow ring of the cylindrical cavity 112 is designed to accommodate both wound and stamped cores for large current range measurement.

Figure 4D:
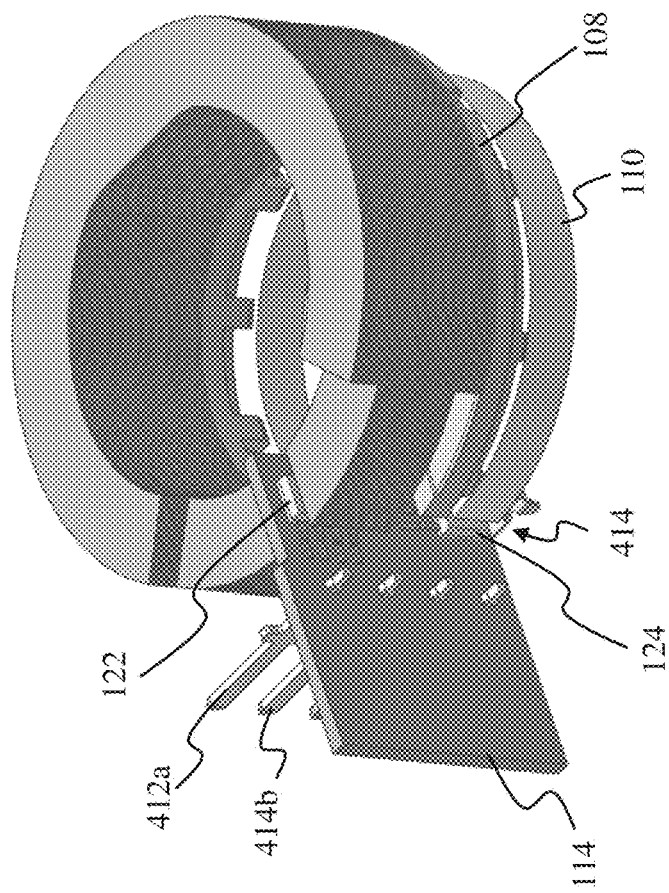
Figure 4C:
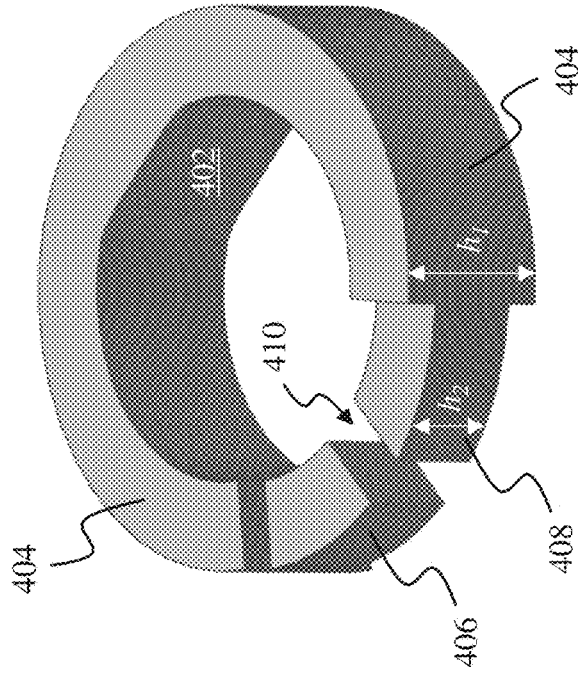

FIGS. 4A-4D are representative drawings of the dual-channel current sensor 300 of FIGS. 3A-3B as well as the stamped core 306, according to exemplary embodiments. FIG. 4A is a perspective view of the dual-channel current sensor 300, FIGS. 4B-4C are perspective views of the stamped core 306, and FIG. 4D is a perspective view of the inner structure of the dual-channel current sensor 300. In FIG. 4A, the housing 102 is shown, along with the already introduced flat zone 136 of the cylindrical cavity 112. In FIGS. 4B-4D, the stamped core 306 is shown. In some embodiments, the stamped core 306 is produced using silicon steel. In other embodiments, the stamped core 306 is produced using nickel ferrite.

In exemplary embodiments, the stamped core 306 also has a flat zone 402. Recall that the housing 102 of the dual-channel current sensor 300 is designed to accept either a wound core or a stamped core. Nevertheless, in exemplary embodiments, the stamped core 306 fits into the cylindrical cavity 112 such that the flat zone 402 of the stamped core 306 fits against the flat zone 136 of the housing 102. The flat zone 402 of the stamped core 306 makes the stamped core a little thicker at its back side. In exemplary embodiments, the increased surface area of the stamped core 306 provides a larger linearity area than would be provided with a rounded surface.

Further, the stamped core 306 features a first portion 404, a second portion 406, and a third portion 408. The first portion 404 occupies the majority of the circumference of the stamped core 306 and is at a first height, $h_1$. The second portion 406 is adjacent one side of a gap 410 and the third portion 408 is adjacent the other side of the gap. The second portion 406 resembles a step down from the flat, top surface of the stamped core 306. Similarly, the third portion 408 resembles a step down from the flat, top surface of the stamped core 306. The second portion 406 and the third portion 408 are at a second height, $h_2$, with $h_1 > h_2$. The stamped core 306 is thus a cylindrically shaped core of a height, $h_1$ (which is larger than that of the small core 310), the core is opened at one end with the gap 410, and, on either side of the gap, there are two portions 406 and 408 that have a smaller height, $h_2$. On the opposite side of the gap 410, there is a flat zone 402.

In exemplary embodiments, the stamped core 306 is shaped as illustrated to increase its saturation point and enable a more linear range of current measurement. Like the flat zone 402, in exemplary embodiments, the portions 404, 406, and 408 of the stamped core 306 increase the linear range of the stamped core 306.

As shown in FIG. 4D, the gap 410 of the stamped core 306 provides an opening through which the PCBA 114 is disposed. Similarly, the core 110 has a gap 414. In exemplary embodiments, the cores 306 and 110 are positioned within the housing 102 so that the gaps 410 and 414 are in alignment with one another. The ASIC 122 on the PCBA 114 is positioned between the gap 410 of the stamped core 306 while the ASIC 124 is positioned between the gap 414 of the smaller core 110. The spacer 108 provides separation between the stamped core 306 and the smaller core 110, which enables the ASICs 122 and 124 to separately and accurately obtain current information about the carrying conductor without interference from one another.

Connector pins 412a and 412b are shown (collectively, "connector pin(s) 412"). In exemplary embodiments, there are four connector pins 412, one for power, one for ground, and two for signals. The connector pins 412 have press-fit features. The rigid positioning parts 134 hold the PCBA 114 during connector pin 412 press-fitting.

Figure 5:
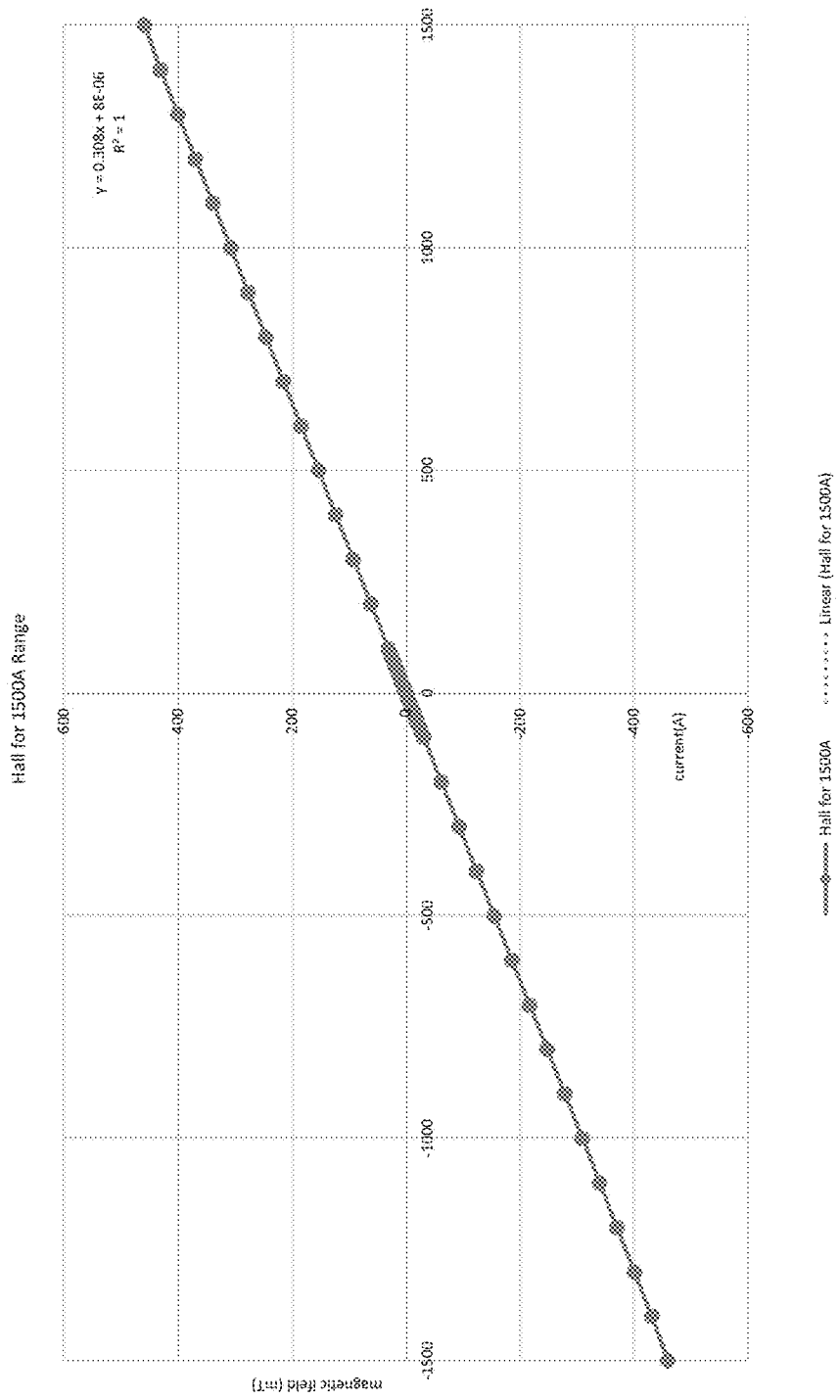
FIG. 5 is a graph illustrating the operation of the Hall sensor in the dual-channel current sensor of FIGS. 3A-3B, according to exemplary embodiments.

FIG. 5 is a representative graph 500 illustrating the characteristics of the dual-channel current sensor 300, according to exemplary embodiments. The graph 600 plots the magnetic field for a given current measured by the dual-channel current sensor 300 for a current range of between −1500 A and 1500 A and the results are highly linear. In exemplary embodiments, the ASIC 122 and the stamped core 106 provide the data shown in the graph 500.

Figure 6:
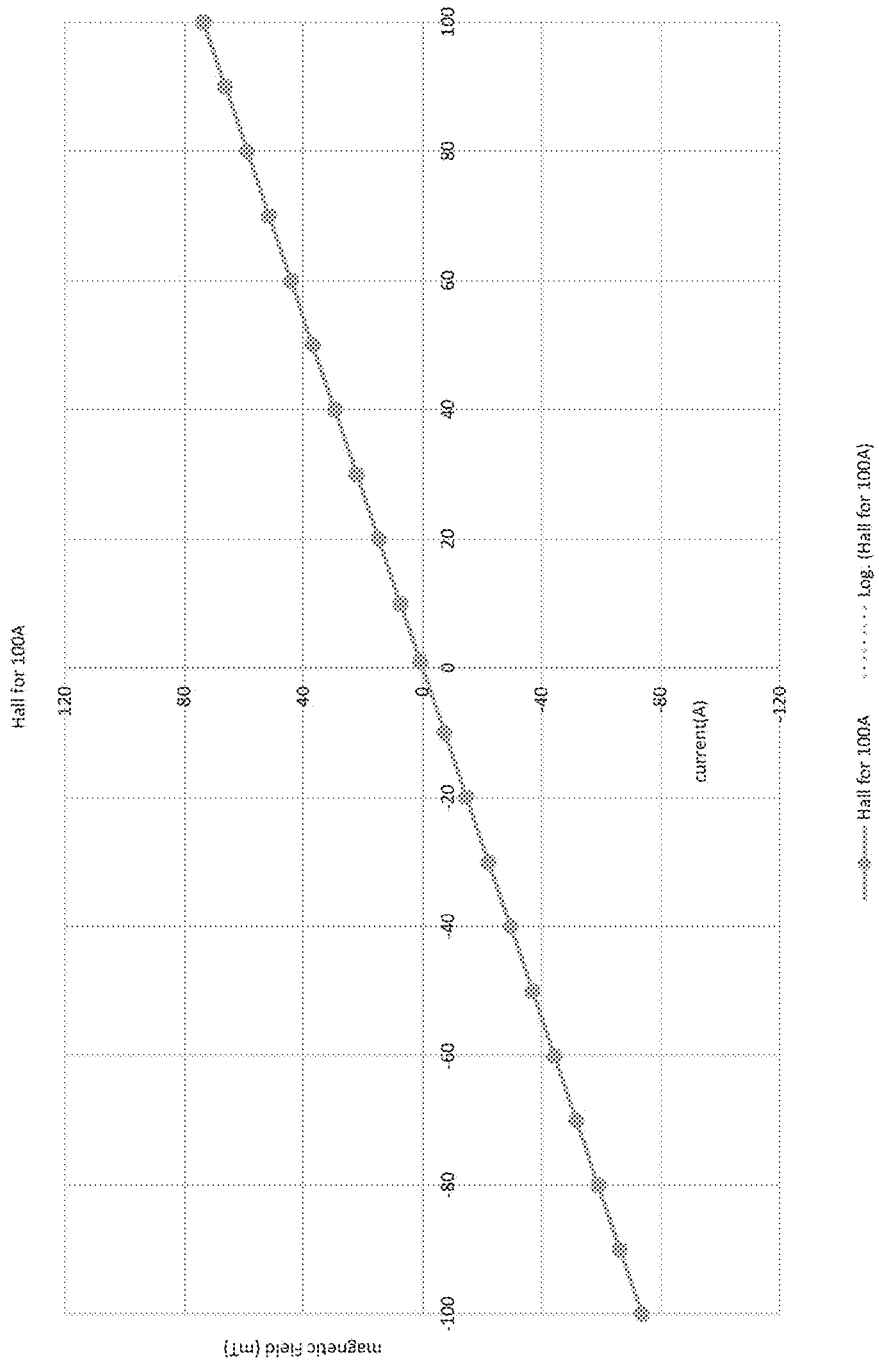
FIG. 6 is a graph illustrating the operation of the Hall sensor in the dual-channel current sensor of FIGS. 3A-3B, according to exemplary embodiments.

FIG. 6 is a representative graph 600 illustrating the characteristics of the dual-channel current sensor 300, according to exemplary embodiments. The graph 600 plots the magnetic field for a given current measured by the dual-channel current sensor 300 for a current range of between −100 A and 100 A. As with the graph 500, the results in graph 600 are highly linear. In exemplary embodiments, the ASIC 124 and the small core 110 provide the data shown in the graph 600.

By having two sets of data, the dual-channel current sensor 300 is able to provide a high degree of accuracy as well as very good accuracy at low current range for better Amp-hr integration, which is useful for EV battery technology.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure is not limited to the described embodiments, but that it has the full scope defined by the language of the following claims, and equivalents thereof.

The invention claimed is:

1. A dual-channel current sensor comprising:
   a housing comprising a cylindrical cavity and an end portion, wherein the cylindrical cavity is open at a first end;
   a first core comprising a cylindrical shape and flattened top and bottom surfaces, the first core further comprising:
      a flat zone disposed on an interior surface; a
      gap disposed orthogonal to and opposite the flat zone;
      a first portion disposed adjacent a first side of the gap; and
      a second portion disposed adjacent a second side of the gap, the second side being opposite the first side, wherein the first core is inserted into the first end of the cylindrical cavity in a first direction;
   a printed circuit board assembly (PCBA) comprising a first sensor, the first sensor being disposed in the gap, wherein the PCBA is inserted into the end portion of the housing in a second direction, wherein the second direction is orthogonal to the first direction;
   a second core having a second gap, the first core having a first height and the second core having a second, smaller height; and
   a spacer, wherein the second core is inserted into the first end of the cylindrical cavity, followed by the spacer, and followed by the first core.

2. The dual-channel current sensor of claim 1, the PCBA further comprising a second sensor, wherein the second sensor is disposed in the second gap.

3. The dual-channel current sensor of claim 2, wherein the first sensor is orthogonal to the second sensor.

4. The dual-channel current sensor of claim 3, wherein the first and second sensors are Hall sensors.

5. The dual-channel current sensor of claim 2, wherein the first sensor provides a current measurement in a range of ±1500 Amperes.

6. The dual-channel current sensor of claim 2, wherein the second sensor provides a current measurement in a range of ±100 Amperes.

7. The dual-channel current sensor of claim 1, the housing further comprising a second flat zone disposed on a second interior surface of the cylindrical cavity.

8. The dual-channel current sensor of claim 7, wherein the flat zone aligns with the second flat zone once the first core is disposed inside the cylindrical cavity.

9. The dual-channel current sensor of claim 1, the housing further comprising a pair of rigid positioning parts to hold the PCBA during press-fit pin insertion.

10. The dual-channel current sensor of claim 1, the housing further comprising an electrical connector receptacle to be coupled to a power source.

11. The dual-channel current sensor of claim 1, wherein the first core is a stamped core and the second core is a wound core.

12. The dual-channel current sensor of claim 1, wherein the first core is a wound core and the second core is a second wound core.

* * * * *